United States Patent [19]

Hagen

[11] Patent Number: 5,079,659
[45] Date of Patent: Jan. 7, 1992

[54] GIMBAL FOR SUPPORTING A HYDRODYNAMIC AIR BEARING SLIDER

[75] Inventor: Tracy M. Hagen, Edina, Minn.

[73] Assignee: Seagate Technology, Inc., Scotts Valley, Calif.

[21] Appl. No.: 549,202

[22] Filed: Jul. 6, 1990

[51] Int. Cl.$^5$ .................. G11B 5/48; G11B 21/16
[52] U.S. Cl. ........................................ 360/104
[58] Field of Search ........................ 360/104–106

[56] References Cited

U.S. PATENT DOCUMENTS

| | | | |
|---|---|---|---|
| 3,489,381 | 1/1970 | Jones | 248/204 |
| 3,581,298 | 5/1971 | Billawala | 340/174.1 |
| 3,582,920 | 6/1971 | Billawala | 340/174.1 |
| 3,593,330 | 7/1971 | Ackley | 340/174.1 |
| 3,668,668 | 6/1972 | Robitschek | 340/174 |
| 3,702,461 | 11/1972 | Cantwell | 340/174 |
| 3,896,495 | 7/1975 | Beecroft | 360/103 |
| 3,931,641 | 1/1976 | Watrous | 360/104 |
| 4,058,843 | 11/1977 | Gyi | 360/103 |
| 4,141,050 | 2/1979 | Wiseley | 360/104 |
| 4,167,765 | 9/1979 | Watrous | 360/103 |
| 4,197,566 | 4/1980 | Suzuki et al. | 360/103 |
| 4,245,267 | 1/1981 | Herman | 360/104 |
| 4,349,851 | 9/1982 | Higashiyama et al. | 360/105 |
| 4,389,688 | 6/1983 | Higashiyama | 360/104 |
| 4,399,476 | 8/1983 | King | 360/104 |
| 4,449,155 | 5/1984 | Meier et al. | 360/104 |
| 4,630,158 | 12/1986 | Spash | 360/103 |
| 4,651,245 | 3/1987 | Kanno | 360/105 |
| 4,740,854 | 4/1988 | Shibuya et al. | 360/104 |
| 4,777,551 | 10/1988 | Seki et al. | 360/104 |
| 4,807,070 | 2/1989 | Isozaki et al. | 360/104 |

FOREIGN PATENT DOCUMENTS 62-1176 1/1987 Japan.

OTHER PUBLICATIONS

IBM Corp., IBM Technical Disclosure Bulletin, vol. 28, No. 11, Apr. 1986, pp. 4786 & 4787.

*Primary Examiner*—A. J. Heinz
*Attorney, Agent, or Firm*—Kinney & Lange

[57] ABSTRACT

A gimbal for supporting a hydrodynamic air bearing slider over recording medium including a gimbal body having generally co-planar side edges meeting at gimbal corners. Tabs positioned at the gimbal corners are bent out of plane with respect to the side edges. Each tab includes an aperture for accepting a corner of the slider. Each tab has a spring tension providing an inward force on the slider to thereby secure the gimbal to the slider.

21 Claims, 4 Drawing Sheets

GIMBAL FOR SUPPORTING A HYDRODYNAMIC AIR BEARING SLIDER

BACKGROUND OF THE INVENTION

The present invention relates to a gimbal for supporting a hydrodynamic air bearing slider over a rotating magnetic medium. More specifically, this invention relates to a self-aligning gimbal that may be secured to the slider without adhesive.

Within a disk drive, a load beam supports a hydrodynamic air bearing slider close to a rotating magnetic disk. The load beam supplies a downward force that counteracts the hydrodynamic lifting force developed by the slider's air bearing. The slider carries a magnetic transducer for communication with individual bit positions on the rotating magnetic disk.

A gimbal is positioned between the load beam and the slider. The gimbal resiliently supports the slider and allows it to pitch and roll while it follows the topography of the rotating disk. As such, the gimbal is a critical element in a magnetic disk drive unit.

Typically, the gimbal is welded to the load beam and is connected to the slider by an adhesive. For example, with both ring-type and beam-type gimbals, the slider is adhesively bonded to a central tongue, or pad, which is supported by resilient beams. Adhesive bonds present several concerns to a gimbal designer.

First, it is generally known that the strength of an adhesive bond is proportional to the size of the bonded area. With the noted gimbal "types", a strong bond between the gimbal and the slider requires a large tongue area. However, enlarging the tongue area increases separation between the resilient beams which excessively increases the pitch and roll stiffness of the gimbal. Thus, the designer is faced with a tradeoff between bond strength and gimbal performance, both of which strongly affect reliability of the disk drive.

Second, adhesive bonds are susceptible to adhesive "bridging". Bridging occurs when the adhesive is squeezed out from an interface between the slider and the tongue and makes a connection to one or more of the resilient beams. This connection prevents the gimbal from performing properly.

Third, adhesive bonds are susceptible to adhesive "wedging". Wedging occurs when the adhesive creates a thin bond near the center of the tongue, and a much thicker bond near the ends of the tongue. This creates a stress condition where the tongue is compressing the adhesive at the ends of the tongue and pulling the adhesive near the center of the tongue. The presence of a pulling load creates a tensile stress that can approach the tensile strength of the adhesive. When the tensile stress exceeds the tensile strength of the adhesive, the bond will break allowing the slider to detach itself from the gimbal.

A fourth concern is the mismatch of the coefficient of thermal expansion ratios of the gimbal material and the slider material. A change in temperature will cause the materials to expand at different rates, which strains the slider and causes the slider to buckle and deform the hydrodynamic air bearing surface.

Fifth, the thin layer of adhesive between the gimbal and the slider creates an electrical insulator. During operation, turbulent air flow around the slider causes a buildup of electrical charge on the slider. This charge must be "bled off" to prevent a discharge across the very small gap between the transducer and the disk. Such a discharge could affect the magnetic recordings on the disk.

A final concern is achieving a desired alignment between the gimbal and the slider. Most gimbals include a load bearing dimple about which the slider can pitch and roll while following the topography of the rotating disk. To achieve a desired fly height, fly pitch and fly roll of the slider, the load bearing dimple must be located with great accuracy with respect to the slider. In a most common method of alignment, tooling alignment pins are used to match up load beam reference holes with gimbal reference holes and gimbal reference holes with slider reference features. Several tolerances can accumulate to reduce alignment accuracy. The tolerances include: load beam reference holes to tooling alignment pins; load beam reference holes to gimbal reference holes; gimbal reference holes to gimbal dimple; tooling alignment pins to slider reference features; and location of the air bearing surface on the slider.

To reduce or eliminate the above concerns, a gimbal incorporating self-attachment features that do not require the use of adhesives is desired. Wisely U.S. Pat. No. 4,141,050 and Meier et al U.S. Pat. 4,449,155 discloses gimbals with similar self-attachment features. These gimbals each include "fingers" that are wedged into a recessed channel of the slider and apply an outward force against the interior walls of the recessed channel to secure the slider to the gimbal. While the above-mentioned patents do reduce or eliminate many of the concerns associated with adhesive bonds, they do not significantly reduce the accumulation of tolerances during alignment. Further, the wedged fingers have a tendency to cause the slider to buckle and deform the hydrodynamic air bearing surface.

SUMMARY OF THE INVENTION

The gimbal of the present invention selfattaches to a hydrodynamic air bearing slider and automatically aligns itself with the slider during attachment. The gimbal includes a gimbal body having generally co-planar side edges meeting at gimbal corners. Tabs positioned at the gimbal corners are bent out of plane with respect to the side edges. Each tab includes an aperture for accepting a corner of the slider. Each tab has a spring tension that provides an inward force on the slider to secure the slider to the gimbal.

In a preferred embodiment, each aperture has dimensions such that the inward force is applied at a neutral bending axis of the slider.

DETAILED DESCRIPTION OF THE PREFERRED EMBODIMENTS

Figure 1:
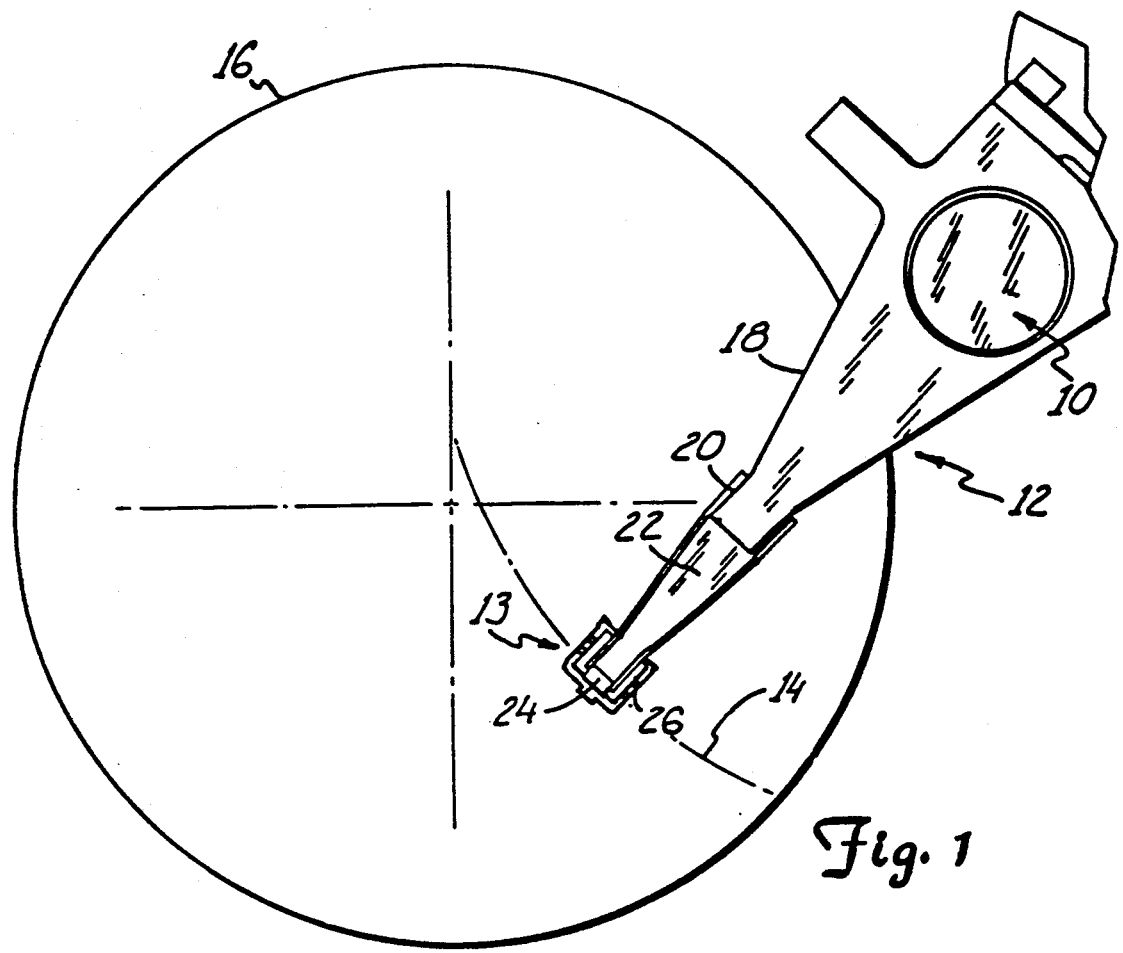
FIG. 1 is a top plan view of an actuator supporting a slider-gimbal assembly in accordance with the present invention.

FIG. is a top plan view of an actuator supporting a slider-gimbal assembly in accordance with the present invention. An actuator 10 and an actuator arm 12 support a slider-gimbal assembly 13 over a magnetic disk 16. The actuator 10 positions the arm 12 along an arc 14 over the magnetic disk 16. The arm 12 includes a supporting arm 18, a base plate 20, and a load beam 22. The supporting arm 18, the base plate 20 and the load beam 22 are connected in a known manner, such as swaging. The slider-gimbal assembly 13 includes a gimbal 24 and a hydrodynamic air bearing slider 26. The arm 12 is known as a rotary actuator arm because the actuator 10 rotates the arm 12 to position the slider 26 along the arc 14.

Figure 2:
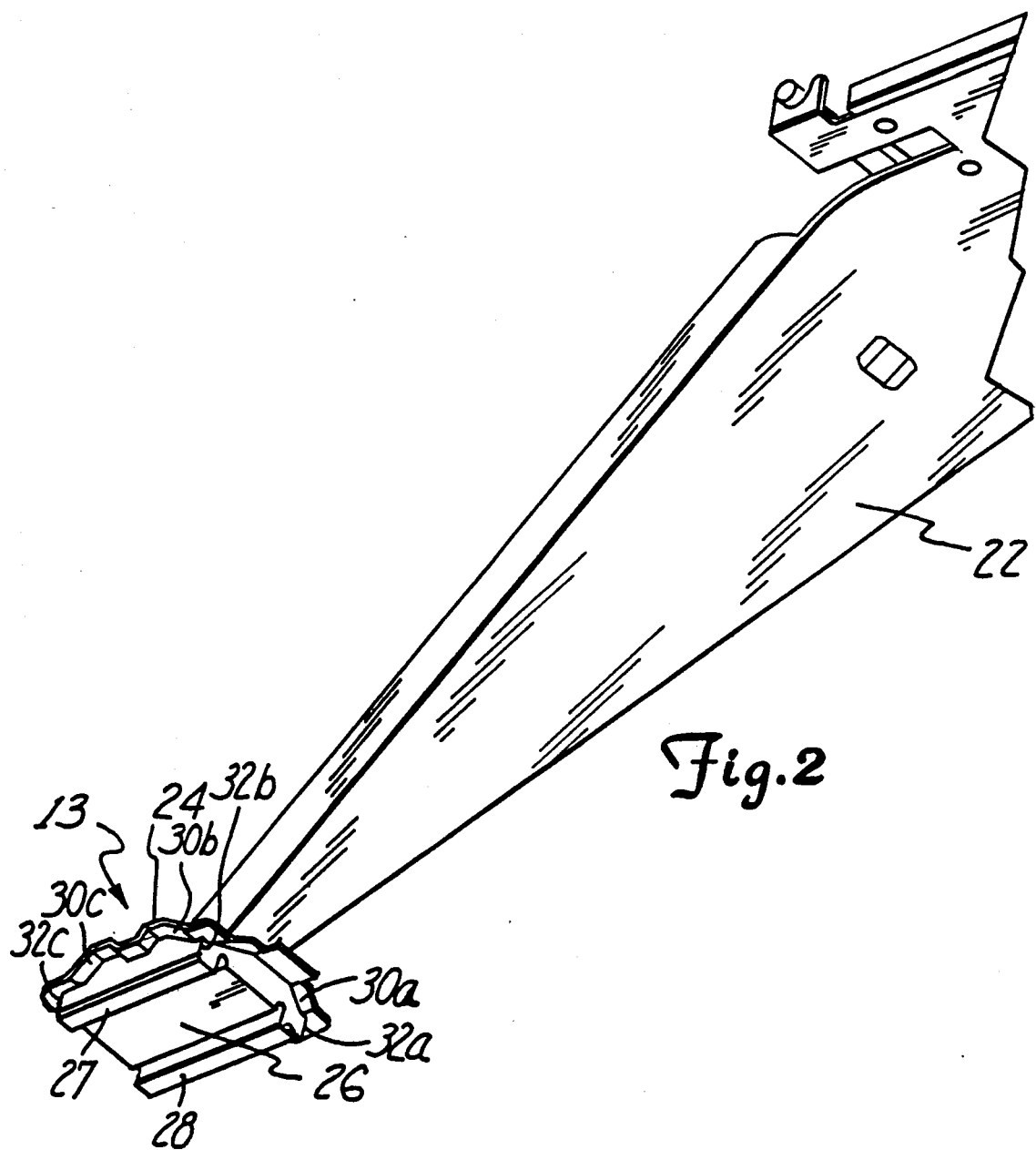
FIG. 2 is a perspective view of a load beam carrying the slider-gimbal assembly, as viewed from beneath the slider-gimbal assembly of FIG. !.

FIG. 2 is a perspective view of the load beam 22 carrying the slider-gimbal assembly 13, as viewed from beneath the load beam 22 in FIG. 1. The gimbal 24 resiliently supports the slider 26 over the disk 16 (see FIG. 1). The slider 26 includes a pair of hydrodynamic air bearing rails 27 and 28. As the disk 16 rotates, air flow between the rails 27 and 28 and the disk 16 pressurizes the rails to lift the slider 26 several microinches above the surface of the disk. The load beam 22 accurately controls slider flying height by counteracting the lifting force. The gimbal 24 allows the slider 26 to pitch and roll while following the topography of the disk 16.

The gimbal 24 is welded or otherwise bonded to the load beam 22. The gimbal 24 includes tabs 30a, 30b, 30c and 30d (30d not shown) that apply inward forces on the slider 26 at corners 32a, 32b, 32c and 32d (32d not shown) to secure the gimbal 24 to the slider 26.

Figure 3:
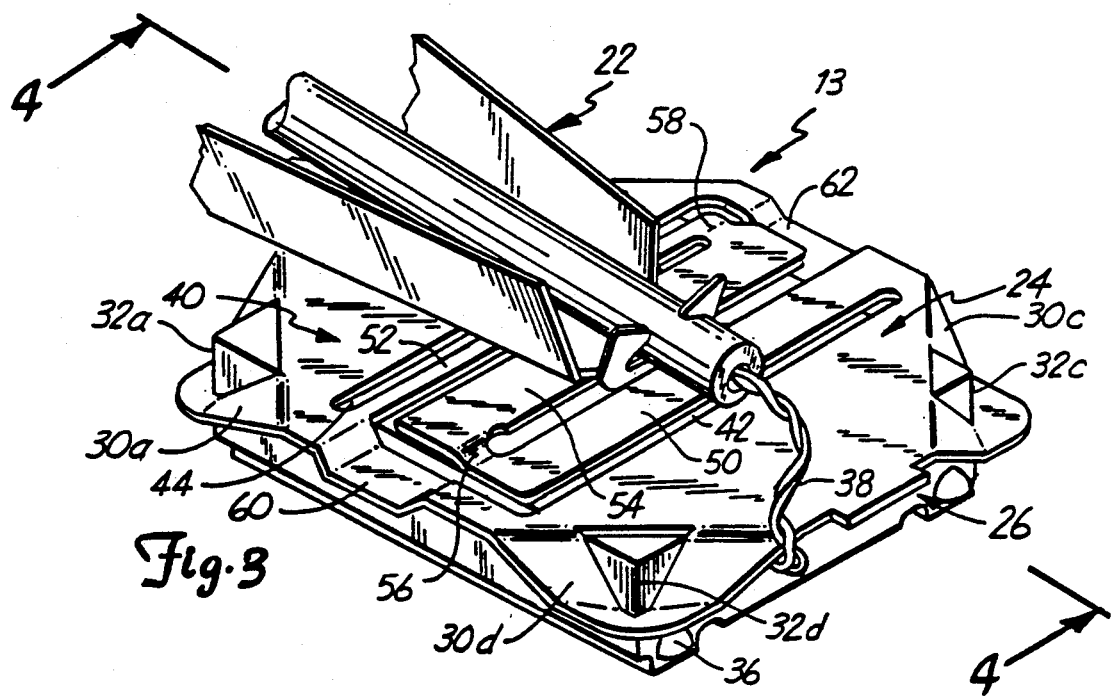
FIG. 3 is an enlarged perspective view of the slider-gimbal assembly, of FIG. 1.
Figure 4:
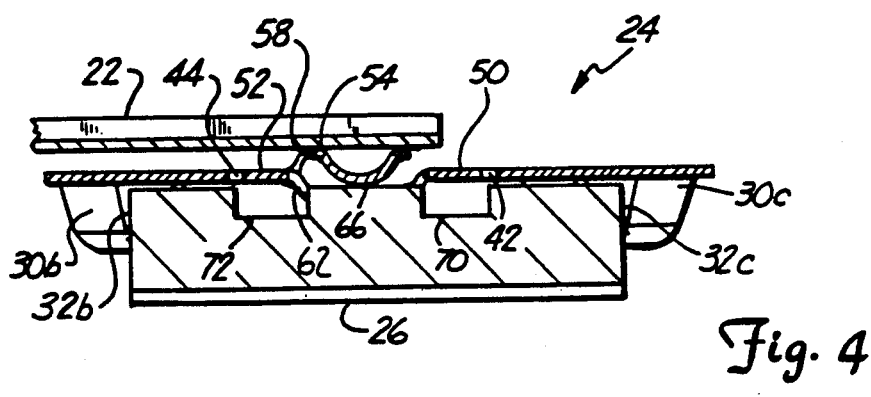
FIG. 4 is a sectional view of the slidergimbal assembly taken along like 4—4 of FIG. 3.

FIGS. 3 and 4 illustrate the slider-gimbal assembly 13 in greater detail. FIG. 3 is a perspective view of the slider-gimbal assembly 13 being carried by the load beam 22. FIG. 4 is a sectional view of the slider-gimbal assembly 13 taken along line 4—4 of FIG. 3. Each tab 30a–30d includes an aperture for accepting one of the corners 32a–32d of the slider 26. The tabs 30a–30d generally form a "socket" into which the slider 26 is inserted for self-attachment. Inserting the slider 26 into the gimbal 24 causes an outward deflection of the tabs 30a–30d. Spring tension within the tabs 30a–30d create inward forces on the slider corners 32a–32d that frictionally hold the gimbal 24 to the slider 26. In this manner, the slider 26 can be secured to the gimbal 24 without the use of adhesives.

In a preferred embodiment, the dimensions of the tabs 30a–30d are designed to apply the inward forces at the neutral bending axis of the slider 26. The slider 26 therefore will not bend or buckle under the attachment forces. This ensures a flat air bearing surface after attachment to the gimbal 24. The dimensions of the tabs 30a–30d may vary, depending upon the dimensions of the slider 26.

The gimbal 24 further includes a flexure seat 40. The flexure seat 40 is formed by a pair of nested and opposing U-shaped cutouts 42 and 44. One leg of each cutout is positioned between both legs of the other cutout. The cutouts 42 and 44 create a pair of substantially parallel and coplanar flexure beams 50 and 52 that are disposed about and support a central tongue 54. The central tongue 54 is suspended between the flexure beams 50 and 52. The central tongue 54 connects to the load beam 22 in a known manner, such as by welding or bonding. The cutouts 42 and 44 will be discussed in greater detail below with reference to FIG. 5.

A pair of bends 56 and 58 offset the central tongue 54 from the plane defined by the flexure beams 50 and 52. The bends 56 and 58 are substantially coincident with the short legs of the U-shaped cutouts 42 and 44, respectively. A pair of end forms 60 and 62 relieve the tension created by the bends 56 and 58 to prevent deformation and stress of the flexure beams 50 and 52. The end forms 60 and 62 are offset from the plane defined by the flexure beams 50 and 52 in a direction opposite that of the offset of the central tongue 54.

The slider 26 includes at least one transducer 36 for communicating with individual bit positions on the disk 16. Electrical leads 38 transmit electrical signals to and from the transducer 36. During read and write operations, the actuator arm 10 rapidly accelerates and then decelerates to reposition the transducer 36 over a desired data track along the arc 14. Accurate positioning of the transducer 36 over the desired data track is critical to disk drive performance.

During acceleration, the inertia of the slider-gimbal assembly 13 creates a moment between the slider 26 and the load beam 22. The moment forces the slider-gimbal assembly 13 to shift positions, or rotate with respect to the load beam 22. This rotation causes the transducer 36 to shift positions with respect to an individual data track causing off-track data errors when the transducer reads or writes data on the wrong data track. Preferably, gimbals have high off-track stiffness.

The off-track stiffness for beam-type gimbals is measured by either the in-plane tension-compression stiffness of the beams or the in-plane bending-shearing stiffness of the beams, depending upon beam orientation with respect to the data tracks. In the present invention, the tension-compression stiffness along the length of the beams 50 and 52 is substantially greater than the bending-shearing stiffness across the beams. The present invention maximizes the off-track stiffness by orienting the beams 50 and 52 generally perpendicular to the data tracks.

The central tongue 54 includes a spherical dimple, or protrusion 66 (shown in FIG. 4) that transmits a load force from the load beam 22 to the slider 26. In the preferred embodiment, the diameter of the dimple base is approximately 2.5 times its height, and its height is approximately 6% that of the length of the slider 26.

The dimple 66 is oriented such that its apex is in point contact with the slider 26, rather than with the load beam 22. This orientation minimizes the distance between the center of mass of the slider 26 and the gimbal pivot point at the apex of the dimple 66. During actuation of the load beam 22, this separation increases the moment forces that act on the air bearing. These forces cause the slider 26 to roll and to fly closer to the disk surface, increasing the likelihood of a head crash (when the slider contacts the disk surface). These forces may also affect the pitch angle of the slider 26 causing the slider to fly either higher or lower, depending upon the direction of the forces. Orienting the dimple 66 such that its apex is in point contact with the slider 26 advantageously reduces pitch moment loading and roll moment loading of the hydrodynamic air bearing due to actuation of the load beam 22 to improve the performance and reliability of the storage device.

The bends 56 and 58 keep the beams 50 and 52 coplanar and in the plane of the dimple-to-slider contact point. When the beams 50 and 52 are in the plane of the dimple to slider contact, deflection of the beams during normal gimbal action is substantially out-of-plane. Therefore, flexure of the beams 50 and 52 does not contain a component of in-plane deflection which has considerable stiffness and results in unwanted decreases in the pitch flexibility and roll flexibility of the gimbal 24.

The slider 26 includes two relief channels 70 and 72 located on the surface adjacent the slider-gimbal interface. The reliefs 70 and 72 are perpendicular to the longitudinal axis of the slider 26 and are located generally adjacent the flexure beams 50 and 52, respectively. The depth of each relief 70 and 72 is approximately equal to the height of the dimple 66. The channels 70 and 72 provide reliefs so that the slider 26 does not inhibit gimbal action throughout the expected range of pitch rotation and roll rotation.

Figure 5:
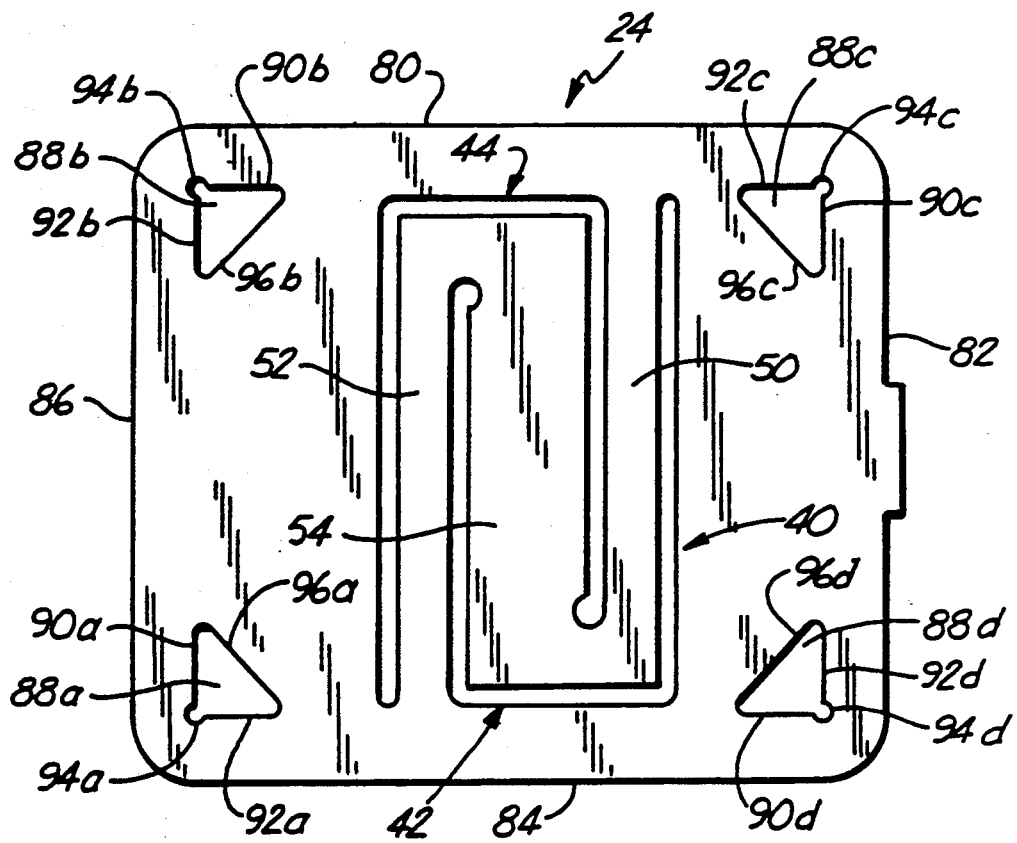
FIG. 5 is top plan view of a gimbal in an unformed, blank state in accordance with the present invention.

FIG. 5 is a top plan view of the gimbal 24 in an unformed, planar, blank state. The gimbal 24 includes side edges 80, 82, 84 and 86 that generally form a rectangle with a length and a width approximately 20% greater than that of the slider 26 (shown in FIG. 3). The gimbal 24 is made out of a thin, high-strength metal such as stainless steel. The gimbal features are created by the well-known process of photolithography by applying photoresist to a flat stock and immersing the material in ferric-chloride, for example.

In the preferred embodiment, the legs of each U-shaped cutout 42 and 44 are unequal in length. The longer leg of each cutout 42 and 44 has a length that is approximately equal to the width of the slider 26 (shown in FIG. 3). The shorter leg has a length that is approximately 86% of the width of the slider 26. The base of each U-shaped cutout 42 and 44, which connects the long and short legs, is positioned approximately equidistant from the adjacent side edge with the end of the longer leg of the other cutout and has a length that is approximately equal to 35% of the length of the slider 26. The U-Shaped cutouts 42 and 44 preferably create flexure beams 50 and 52 having widths approximately 9% of the length of the slider 26.

Each corner of the gimbal 24 includes an aperture (88a, 88b, 88c and 88d) for accepting the slider corners 32a-32d, respectively. Each aperture 88a-88d includes two edges 90a-90d and 92a-92d that meet at a vertex 94a-94d, respectively. The length of each edge 90a-90d and 92a-92d is approximately 17% of the width of the slider 26. Preferably, each vertex 94a-94d includes a relief hole of approximately 0.002 to 0.004 inches in diameter.

In the preferred embodiment, the apertures 88a-88d are generally isosceles right triangles in which the edges 90a-90d and 92a-92d are generally parallel to the side edges 80, 82, 84 and 86. Each aperture 88a-88d further includes a third edge or hypotenuse 96a-96d. However, any aperture geometry may be used with the present invention, as long as each vertex 94a-94d has an angle of at least 80 degrees for accepting the corners 32a-32d of the slider 26.

When the gimbal 24 is in the unformed state, the vertices 94a-94d lie on a rectangle having a length and a width that is approximately 5% greater than that of the slider 26. It is to be understood that any of the preferred dimensions or geometries described above in any of the embodiments may be varied within the scope of the present invention.

Figure 6:
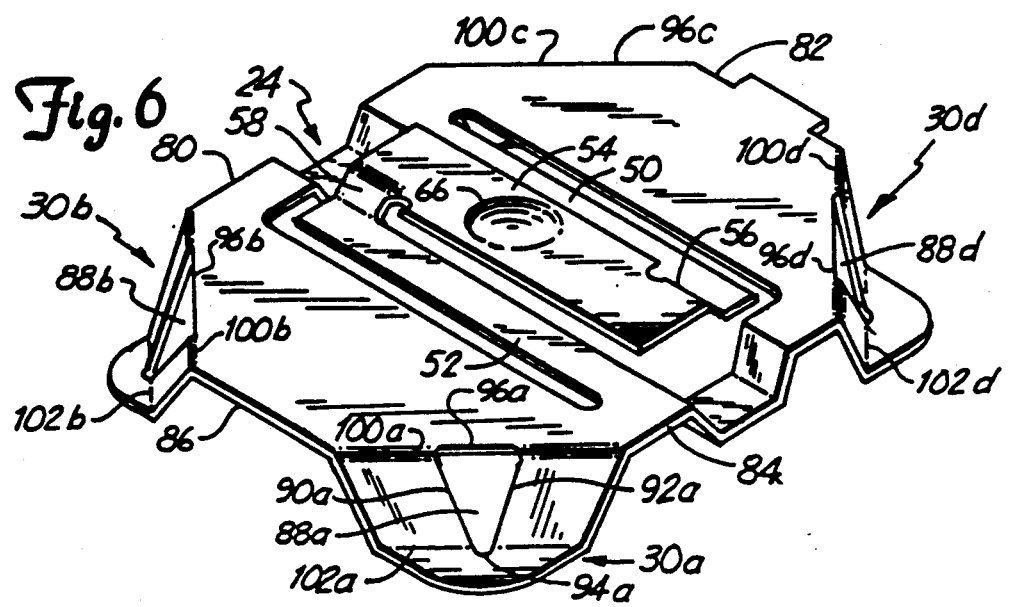
FIG. 6 is a perspective view of a gimbal in a formed state, in accordance with the present invention.

FIG. 6 is a perspective view of the gimbal 24 in a formed state. FIG. 6 shows the dimple 66 that is formed out of the tongue 54 in greater detail. The bends 56 and 58 offset the tongue 54 so that the apex of the dimple 66 is in the plane generally defined by the flexure beams 50 and 52.

The corners of the gimbal 24 include bends 100a-100d and 102a-102d that form the tabs 30a-30d, respectively. Preferably, the bends 100a-100d are substantially coincident with the hypotenuses 96a-96d, respectively. The bends 100d-100d are bent in a first direction and preferably form an angle of approximately 45 degrees to 95 degrees with respect to a plane generally defined by the side edges 80, 82, 84 and 86. The bends 102a-102d are generally coincident with the vertices 94a-94d and are bent in a second direction, opposite to the first direction. The bends 102a-102d are preferably bent in the second direction at an angle of approximately 0 degrees to 45 degrees.

The bends 100a-100d and 102a-102d form a proximal and a distal end of each tab 30a-30d. The tabs 30a-30d, together with the plane defined by the side edges 80, 82, 84 and 86, generally form a socket in which to insert the slider 26 for attachment. The proximal portions of the tabs 30a-30d have spring tensions that create inward forces which urge the vertices 94a-94d against the corners 32a-32d (shown in FIG. 3). The inward forces create frictional interfaces that hold the gimbal 24 to the slider 26. The distal portion of each tab 30a-30d facilitates insertion of the slider 26 into the gimbal 24, as shown in greater detail in FIG. 7.

In the formed state, the rectangle formed by the vertices 94a-94d is substantially smaller in size than in the unformed, blank state. Preferably, the rectangle has a length and width approximately 5% less than that of the slider 26 in the formed state.

Figure 7:
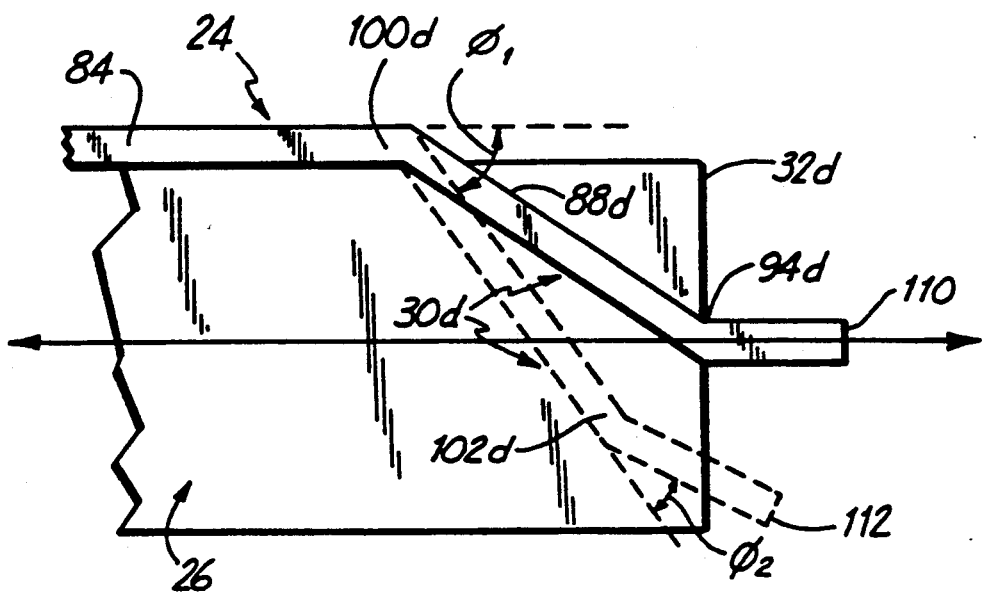
FIG. 7 is an enlarged partial view of a slider corner inserted into a corner tab in the gimbal of FIG. 6, in accordance with the present invention.

FIG. 7 is an enlarged partial view of the slider 26 fully seated into the gimbal 24. The slider corner 32d projects through the aperture 88d in the tab 30d. The tab 30d is shown in a deflected state 110 and in a free state 112 (shown in shadow). Before the slider 26 is inserted into the gimbal 24, the tab 30d remains in the pre-formed, free state 112. Urging the slider 26 into the gimbal 24 forces the tab 30d from the from the free state 112 to the deflected state 110. In this action, the distal end of tab 30d acts as a caming surface to deflect the tab 30d. The spring tension created by deflecting the tab 30d creates an inward force on the corner 32d at the vertex 94d. This inward force creates a frictional interface between the corner 32d and the vertex 34d sufficient to hold the slider 26 within the gimbal 24.

When the slider 26 is fully seated in the gimbal 24, each corner tab 30a-30d will press inwardly against the slider with a force of approximately 50-200 grams. The magnitude and location at which this force is applied may be varied by varying the length of the aperture edges 90a-90d and 92a-92d (shown in FIG. 5) and by varying the angle and location of the bends 100a-100d. Preferably, the inward force is applied on the neutral bending axis of the slider 26 to eliminate any tendency of the slider to buckle and deform the surface of the hydrodynamic air bearing.

In FIG. 7, the bend 100d creates an angle $\phi_1$ between the side edge 84 and the tab 30d. The angle $\phi_1$ may range from about 45 degrees to about 95 degrees. Preferably, the angle $\phi_1$ is about 60 degrees. The bend 102d creates an angle $\phi_2$ between the proximal portion and the distal portion of the tab 30d. The angle $\phi_2$ may range from about 0 degrees to about 45 degrees. Preferrably the angle $\phi_2$ is about 30 degrees.

Problems associated with differences in the coefficients of linear thermal expansion between the slider 26 and the gimbal 24 are virtually eliminated with the present invention. Variations in temperature cause a predictable deflection of the gimbal's corner tabs 30a-30d. The deflections of the corner tabs 30a-30d caused by a change in temperature is substantially less than the deflections caused by insertion of the slider 26 into the gimbal 24. Therefore, the inward force of the tabs 30a-30d against the slider 26 remains substantially constant over the temperature range expected in operation.

The gimbal of the present invention also provides the necessary means to accurately position the slider 26 with respect to the dimple 66. The force deflection characteristics of each corner tab 30a-30d is substantially identical. The corner tabs 30a-30d are loaded equally in the presence of the slider 26, thereby keeping the longitudinal and transverse axis of the gimbal 24 coincident with the longitudinal and transverse axis of the slider 26. The accumulation of tolerances involved in head alignment is therefore reduced from those in the prior art.

Those familiar in the art are aware that the photolithography techniques used in manufacturing of gimbals is a process that produces no wear to the master. Etched features in the first gimbal produced from the master are substantially identical to the features of the last gimbal produced. Hence, if the variation in corner tab location is negligible, the stack up of tolerances involved with head alignment is reduced to the variation in the location of the formed dimple with respect to the corner tabs and the variation of the location of the hydrodynamic air bearing surface with respect to the outer edges of the slider.

Further, the present invention provides electrical conduction paths between the slider 26 and the gimbal 24 to discharge the static electrical charge that continually accumulates on the slider during operation. This reduces the likelihood of ionization of the air gap between the slider and the recording medium which can result in significant damage to the slider or the medium or both. The conduction paths are created at the frictional interfaces between the corner tabs and the corners of the slider and at the dimple-slider contact point.

Although the present invention has been described with reference to preferred embodiments, workers skilled in the art will recognize that changes may be made in form and detail without departing from the spirit and scope of the invention.

What is claimed is:

1. A gimbal for supporting a hydrodynamic air bearing slider over a recording medium, the gimbal comprising:
   a gimbal body having generally co-planar side edges extending between gimbal corners; and
   tabs at the gimbal corners bent out of plane with respect to the side edges, each tab having an aperture for accepting a corner of the slider and having a spring tension providing an inward force on the slider to thereby secure the gimbal to the slider.

2. The gimbal of claim 1 wherein each tab and aperture has dimensions such that the inward force is applied at a neutral bending axis on the slider.

3. The gimbal of claim 1 wherein the gimbal body is generally rectangular and the apertures define a rectangle having a length and a width that are larger than the length and width of the slider when the gimbal is a generally planar blank workpiece in an unformed state.

4. The gimbal of claim 1 wherein the gimbal body is rectangular and the apertures define a rectangle having a length and a width that are smaller than the length and width of the slider when the gimbal is in a non-planar, formed state.

5. The gimbal of claim 1 wherein the gimbal body comprises a pivot projecting from the gimbal body and positioned generally at the center of the gimbal body.

6. The gimbal of claim 5 wherein the pivot is offset from the plane generally defined by the side edges such that the apex of the pivot is generally coincident with the plane for point contact with the slider.

7. The gimbal of claim 1 wherein the gimbal body is generally rectangular and the apertures are generally isosceles right triangles, each triangle comprising first and second legs of substantially equal length which are connected by a vertex and form a generally right angle.

8. The gimbal of claim 7 wherein the first and second legs are substantially parallel to the side edges.

9. The gimbal of claim 1 wherein each aperture has two edges that meet at a vertex and form an angle of at least 80 degrees, each vertex for accepting a corner of the slider.

10. The gimbal of claim 9 wherein the slider is generally rectangular and the vertices define a rectangle having a length and a width which are larger than the length and width of the slider when the gimbal is a generally planar blank workpiece in an unformed state.

11. The gimbal of claim 9 wherein the slider is generally rectangular and the vertices define a rectangle having a length and a width which are smaller than the length and width of the slider when the gimbal is in a non-planar, formed state.

12. The gimbal of claim 9 wherein each aperture comprises a relief hole coincident with the vertex for accepting a corner of the slider.

13. The gimbal of claim 9 wherein each tab comprises a first bend coincident with an innermost edge of the aperture such that the tab and the aperture are bent in a first direction with respect to the side edges.

14. The gimbal of claim 13 wherein the first bend creates an angle between the tab and the co-planar side edges of approximately 45 degrees to approximately 95 degrees.

15. The gimbal of claim 13 wherein each tab further comprises a second bend in a second direction opposite to the first direction and substantially coincident with the vertex.

16. The gimbal of claim 15 wherein the second bend defines a proximal tab portion and a distal tab portion, the second bend creating an angle between the proximal tab portion and the distal tab portion of approximately 0 degrees to approximately 45 degrees.

17. The gimbal of claim 1 and further comprising a flexure seat having first and second co-planar flexure beams disposed about and supporting a central tongue.

18. The gimbal of claim 17 wherein the recording medium comprises concentric data tracks and the first and second flexure beams are generally perpendicular to the data tracks.

19. The gimbal of claim 17 and further comprising a pivot projecting from the central tongue for point contact with the slider, the central tongue being offset from the plane defined by the first and second flexure beams such that the apex of the pivot is coincident with the plane.

20. The gimbal of claim 19 wherein the central tongue is offset by a plurality of bends substantially parallel to the first and second flexure beams.

21. The gimbal of claim 17 and further comprising a pivot projecting from the central tongue for point contact with the slider, wherein the central tongue is offset from the plane defined by the first and second flexure beams such that the apex of the pivot is coincident with the plane and wherein the slider comprises first and second recess channels adapted to accept first and second flexure beams, respectively, for free flexure thereof.

* * * * *